T. Ryan.

Process for Forming Wrought Iron Wheels.

Nº 93,483. Patented Aug. 10, 1869.

Witnesses;
A. W. Almquist
W. Dean Overell

Inventor;
T. Ryan
Munn & Co
Attorneys

United States Patent Office.

THOMAS RYAN, OF SCOTT BAR, CALIFORNIA.

Letters Patent No. 93,483, dated August 10, 1869.

IMPROVED PROCESS FOR FORMING THE HUB AND SPOKES OF WROUGHT-IRON WHEELS.

The Schedule referred to in these Letters Patent and making part of the same.

To all whom it may concern:

Be it known that I, THOMAS RYAN, of Scott Bar, in the county of Siskiyou, and State of California, have invented a new and useful Improvement in the Method of Making Wheels; and I do hereby declare that the following is a full, clear, and exact description thereof, which will enable others skilled in the art to make and use the same, reference being had to the accompanying drawings, forming part of this specification.

This invention consists in a useful and improved method of making wheels of carriages and of all descriptions of vehicles, and all descriptions of spoked wheels, whereby they are made much more durable than wheels constructed in the ordinary manner.

In the accompanying sheet of drawings—

Similar letters of reference indicate corresponding parts.

Figure 1:
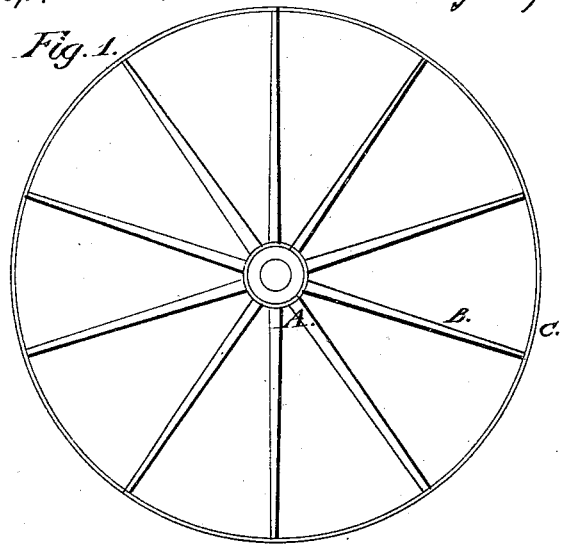
Figure 1 represents a side view of a wheel constructed according to my invention.
Figure 2:
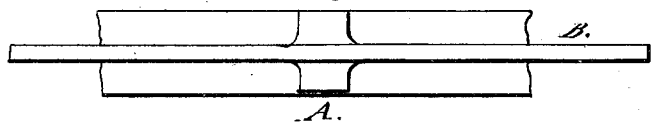
Figures 2 and 3 are views in red color, showing the method of forging the hub and spokes from the piece of iron.
Figure 3:
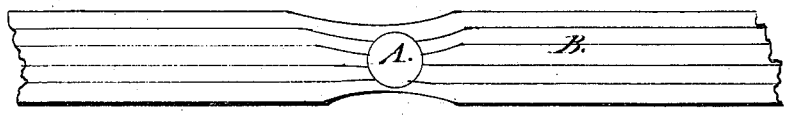

A is the hub, and
B represents the spokes of the wheel.
C is the tire.

In carrying out my invention, I employ a piece of iron of sufficient size, shaped much like that used for a horseshoe. I flatten the piece down at the ends (leaving shoulders for the hub in the middle) to the thickness required for the width of the spokes, and I then split the iron into five (more or less) strips at each end for the spokes.

On the ends of the spokes so formed, I form shoulders for the tire or rim of the wheel. The spokes are then spread and placed in proper position.

The spokes and the hub are finished up in a workman-like manner, the rim of the wheel is attached, and the wheel is complete.

By this method of forming the wheel, the expense is not increased, while the wheel is indestructible.

Having thus described my invention,

I claim as new, and desire to secure by Letters Patent—

Constructing the hubs and spokes of wheels of a single piece of metal, by substantially the method described.

THOMAS RYAN.

Witnesses:
W. I. WILLIAMS,
C. L. WILLARD.